(12) United States Patent
Turney et al.

(10) Patent No.: US 12,038,179 B2
(45) Date of Patent: Jul. 16, 2024

(54) COOLING FOR DETONATION ENGINES

(71) Applicant: Raytheon Technologies Corporation, Farmington, CT (US)

(72) Inventors: Joseph Turney, Amston, CT (US); Christopher Britton Greene, Hebron, CT (US); Peter A T Cocks, South Glastonbury, CT (US); Andrzej Ernest Kuczek, Bristol, CT (US); James M. Donohue, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/226,444

(22) Filed: Apr. 9, 2021

(65) Prior Publication Data
US 2023/0220999 A1 Jul. 13, 2023

(51) Int. Cl.
*F23R 7/00* (2006.01)
*F02K 7/02* (2006.01)
*F23C 15/00* (2006.01)
*F23R 3/00* (2006.01)

(52) U.S. Cl.
CPC ............. *F23R 7/00* (2013.01); *F02K 7/02* (2013.01); *F23C 15/00* (2013.01); *F23R 3/002* (2013.01); *F05D 2250/25* (2013.01); *F23R 2900/03043* (2013.01)

(58) Field of Classification Search
CPC .. F02C 7/224; F23R 7/00; Y02T 50/60; F02K 7/02; F02K 7/08; F01D 25/12; F05D 2250/25; F05D 2260/96
See application file for complete search history.

(56) References Cited

U.S. PATENT DOCUMENTS

| | | | | |
|---|---|---|---|---|
| 5,193,338 | A * | 3/1993 | Firey | C10J 3/04 60/39.12 |
| 6,886,325 | B2 * | 5/2005 | Norris | F02C 3/16 60/39.38 |
| 7,278,256 | B2 * | 10/2007 | Norris | F23R 7/00 60/39.38 |
| 7,526,912 | B2 * | 5/2009 | Tangirala | F23R 3/005 60/39.76 |
| 7,784,265 | B2 * | 8/2010 | Rasheed | F02C 5/00 60/39.76 |

(Continued)

OTHER PUBLICATIONS

"Design Criteria for Water Cooled Systems of Induction Machines" by Marco Satrustegui et al., Applied Thermal Engineering, vol. 114, Mar. 5, 2017, pp. 1018-1028.

*Primary Examiner* — Craig Kim
(74) *Attorney, Agent, or Firm* — Bachman & LaPointe, P.C.

(57) ABSTRACT

A combustor for a detonation engine includes a radially outer wall extending along an axis; a radially inner wall extending along the axis, wherein the radially inner wall is positioned at least partially within the radially outer wall to define an annular detonation chamber having an inlet for fuel and oxidant and an outlet; a cooling flow passage defined along at least one of the radially outer wall and the radially inner wall and comprising at least two axially spaced cooling flow passage sections, whereby a different cooling rate can be implemented in the at least two axially spaced cooling flow passage sections.

17 Claims, 5 Drawing Sheets

(56) References Cited

U.S. PATENT DOCUMENTS

| | | | | |
|---|---|---|---|---|
| 8,978,387 | B2* | 3/2015 | Tangirala | F02C 5/02 |
| | | | | 60/39.38 |
| 9,551,299 | B2* | 1/2017 | Loebig | F02K 7/02 |
| 11,326,617 | B2* | 5/2022 | Greene | F04D 29/366 |
| 2005/0126755 | A1* | 6/2005 | Berry | F02C 5/00 |
| | | | | 165/80.3 |
| 2006/0260291 | A1* | 11/2006 | Vandervort | F23C 15/00 |
| | | | | 60/39.76 |
| 2007/0180814 | A1* | 8/2007 | Tangirala | F02K 7/02 |
| | | | | 60/204 |
| 2012/0102916 | A1* | 5/2012 | Bunker | F02K 7/02 |
| | | | | 60/247 |
| 2012/0192545 | A1* | 8/2012 | Tangirala | F02C 5/11 |
| | | | | 60/247 |
| 2018/0363555 | A1* | 12/2018 | Zelina | F23R 3/005 |

* cited by examiner

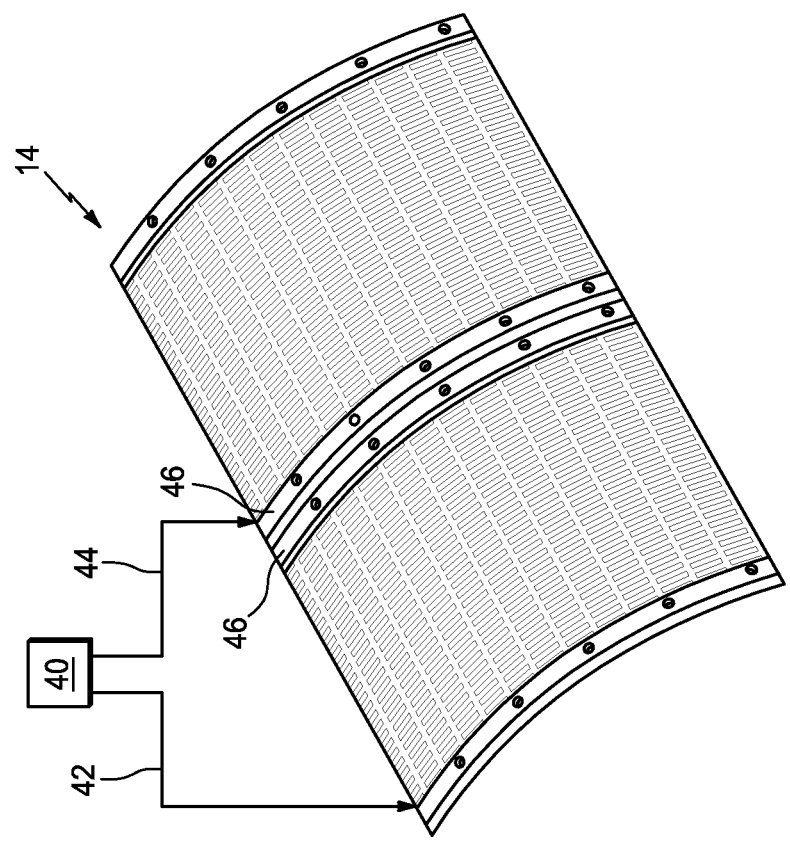
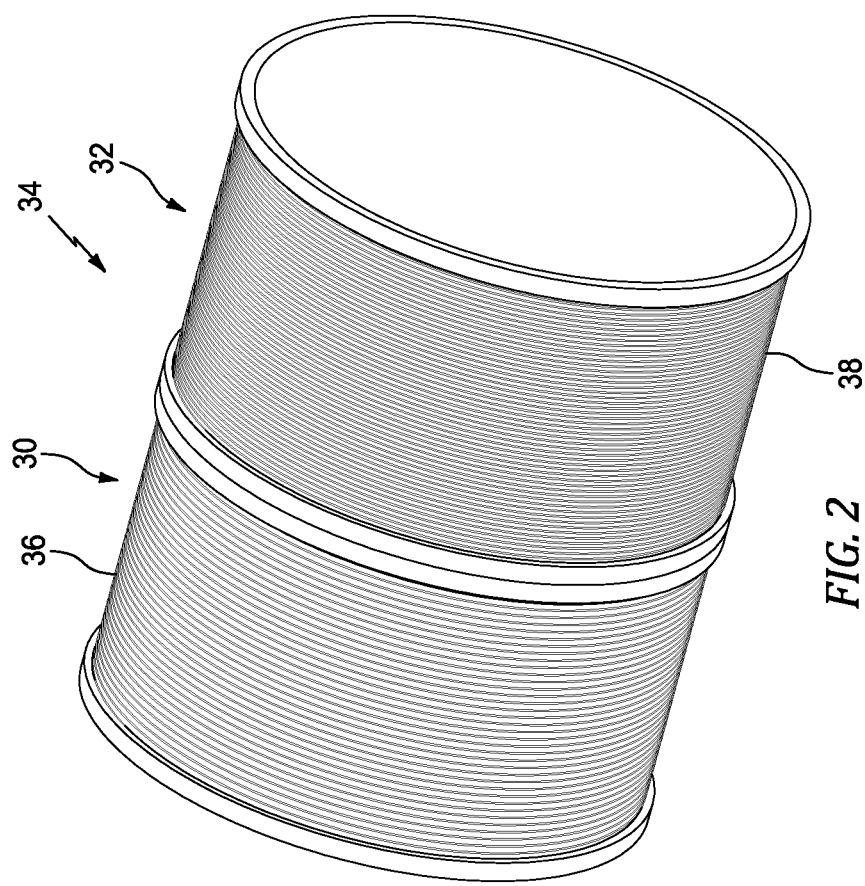

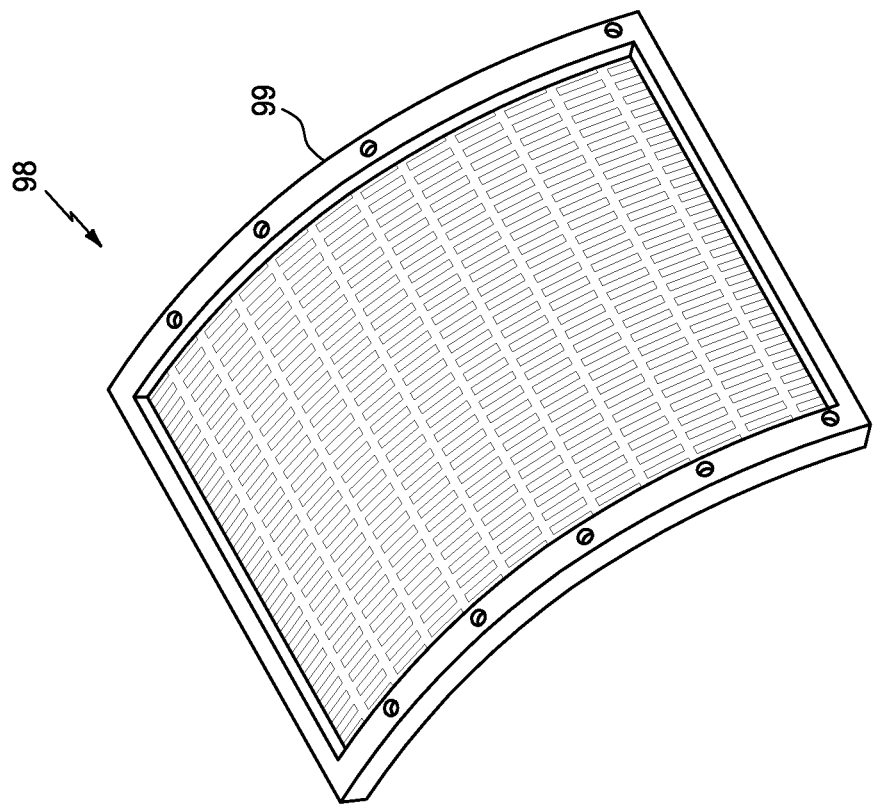
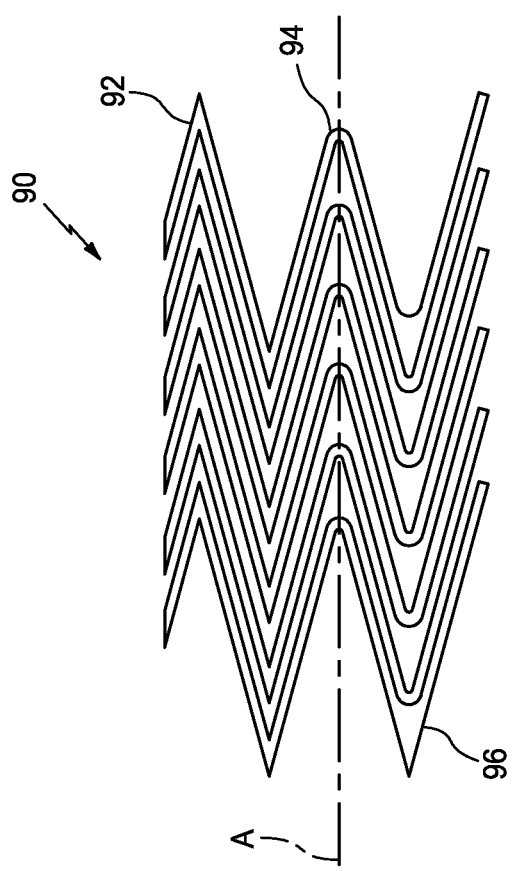
FIG. 9
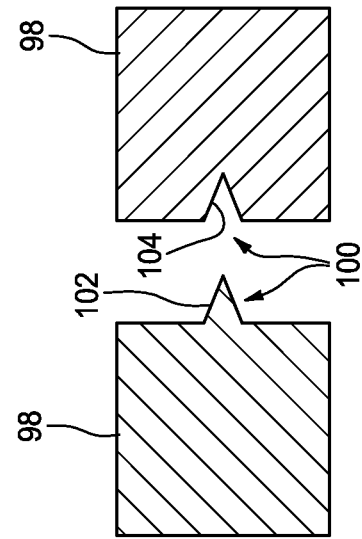
FIG. 10
FIG. 11

COOLING FOR DETONATION ENGINES

GOVERNMENT LICENSE RIGHTS

This invention was made with government support under contract number FA8650-18-D-2062, Task Order FA8650-18-F-2077 awarded by the United States Air Force. The government has certain rights in the invention.

BACKGROUND

The disclosure relates to detonation engines and, more particularly, to structures for cooling the detonation engines and methods for manufacturing structures for cooling the detonation engines.

Detonation engines include pulse detonation engines and rotating detonation engines. Pulse detonation engines (PDE) includes a tube with an inlet end through which a fuel and oxidant (air) mixture enters and an outlet end from which exhaust exists. A detonation wave travels the length of the tube and consumes the fuel and air mixture. The burned fuel and air mixture (e.g., combustion gases) exits the tube as an exhaust flow.

Rotating detonation engines (RDE) includes an annulus with an inlet end through which a fuel and air mixture enters and an outlet end from which exhaust exits. A detonation wave travels in a circumferential direction of the annulus and consumes the incoming fuel and air mixture. The burned fuel and air mixture (e.g., combustion gases) exits the annulus as an exhaust flow.

Detonation engines are a known form of propulsion and power generation technology having desirable lower entropy rise of detonative processes, as compared to constant pressure deflagration. Consequently, detonation engines have the potential to propel vehicles at higher thermodynamic efficiencies than are achieved with deflagration-based engines. Both types of engines are being considered as a possible alternative to gas turbine or ramjet engines.

The detonation wave provides a high-pressure region in an expansion region of the combustion. Rotating detonation pressure gain combustion systems can have significant advantages over other alternatives including pulse detonation pressure gain combustors.

An RDE is generally operated at a high equivalence ratio. Further, since detonation is in an annulus defined between an inner and an outer wall, both walls must be cooled. Thus, thermal management is a significant challenge in detonation engines. Detonation in the combustion annulus causes a high heat flux on the walls of the detonation and exhaust cavity. As a result, the walls can overheat unless aggressively cooled.

Known efforts to provide this aggressive cooling have the drawbacks of overcooling and/or undercooling certain areas. Specifically, greater heat is experienced in the detonation zone, where a large amount of cooling is needed, while a lesser amount of heat is present in the exhaust zone, which can lead to overcooling of this zone and a loss of engine efficiency.

In addition, known efforts to build suitable cooling passages around the engine results in manufacturing steps that can be challenging and expensive.

SUMMARY

In one non-limiting configuration, a combustor for a detonation engine comprises a radially outer wall extending along an axis; a radially inner wall extending along the axis, wherein the radially inner wall is positioned at least partially within the radially outer wall to define an annular detonation chamber having an inlet for fuel and oxidant and an outlet; a cooling flow passage defined along at least one of the radially outer wall and the radially inner wall and comprising at least two axially spaced cooling flow passage sections, whereby a different cooling rate can be implemented in the at least two axially spaced cooling flow passage sections.

In another non-limiting configuration, the annular detonation chamber has a detonation zone and an exhaust zone, and a first of the at least two cooling flow passage sections is axially aligned with the detonation zone, and a second of the at least two cooling flow passage sections is axially aligned with the exhaust zone.

In still another non-limiting configuration, each of the at least two axially spaced cooling flow passage sections comprises a wall defining cooling flow passages and a portion of the at least one of the radially outer wall and the radially inner wall.

In a further non-limiting configuration, the at least one of the radially outer wall and the radially inner wall is defined in axially or radially spaced wall sections, and the spaced wall sections contain a portion of the at least two axially spaced cooling flow passage sections.

In a still further non-limiting configuration, the axially or radially spaced wall sections meet at wall edges, and the combustor further comprises interlocking structure defined along the wall edges whereby the axially or radially spaced wall sections are held in proper position relative to each other during assembly.

In another non-limiting configuration, cooling flow passages are configured differently between the at least two axially spaced cooling flow passage sections.

In still another non-limiting configuration, the at least two axially spaced cooling flow passage sections each have cooling passages arranged in a helical flow pattern, and the helical flow pattern of one of the at least two spaced cooling flow passage sections has a tighter spiral than the helical flow pattern of another of the at least two cooling flow passage sections.

In a further non-limiting configuration, the at least two axially spaced cooling flow passage sections have different flow volume per length along the axis.

In a still further non-limiting configuration, the at least two axially spaced cooling flow passage sections meet at edges, and have edge cooling passages at the edges that are configured differently from cooling passages at a central portion of the at least two axially spaced cooling flow passage sections.

In another non-limiting configuration, the edge cooling passages are straight cooling passages substantially parallel to the edges.

In still another non-limiting configuration, the at least two cooling flow passage sections have cooling passages defined in a circumferential zig-zag pattern.

In a further non-limiting configuration, the at least two cooling flow passage sections have cooling passages defined in an axial zig-zag pattern.

In a still further non-limiting configuration, the at least two cooling flow passage sections have cooling passages defined in a chevron pattern.

In another non-limiting configuration, the at least two cooling flow passage sections comprise an inner cooling flow passage assembly having at least two inner cooling flow passage sections defined along the radially inner wall and an outer cooling flow passage assembly having at least two outer cooling flow passage sections defined along the radially outer wall.

In still another non-limiting configuration, the combustor further comprises separate cooling fluid supply to the at least two cooling flow passage sections whereby flow to the at least two cooling flow passage sections can be metered at different rates to the at least two cooling flow passage sections.

In another non-limiting configuration, the combustor further comprises a control unit for controlling cooling rate in each of the at least two cooling flow passage sections.

In still another non-limiting configuration, the combustor further comprises a bistate fluidic valve positioned between at least one of the at least two cooling flow passage sections and a source of coolant, wherein the bistate fluidic valve comprises a valve which is triggered by temperature between a closed condition and an open condition.

In a further non-limiting configuration, a method is provided for making a wall structure for a detonation engine, wherein the detonation engine comprises a radially outer wall extending along an axis; and a radially inner wall extending along the axis, wherein the radially inner wall is positioned at least partially within the radially outer wall to define a detonation chamber having an inlet for fuel and oxidant and an outlet, wherein the method comprises the steps of manufacturing at least one of the radially outer wall and the radially inner wall in wall sections, wherein each wall section contains a section of a cooling flow passage; and assembling the wall sections to form the at least one of the radially outer wall and the radially inner wall.

In a still further non-limiting configuration, the wall sections comprise at least two axially separate wall sections having axially separate cooling flow passage sections, and the assembling comprises positioning the wall sections adjacent to each other along the axis.

In another non-limiting configuration, the manufacturing comprises additive manufacturing.

In still another non-limiting configuration, the manufacturing comprises direct metal laser sintering.

In a further non-limiting configuration, the manufacturing further comprises manufacturing an interlocking structure along edges of the wall sections, and the assembling further comprises engaging the interlocking structure at the edges of the wall sections.

In a still further non-limiting configuration, a method for cooling a rotating detonation engine comprises the steps of initiating a detonation wave in an annular detonation chamber of a rotating detonation engine comprising a radially outer wall extending along an axis and a radially inner wall extending along the axis, wherein the radially inner wall is positioned at least partially within the radially outer wall to define the annular detonation chamber having an inlet for fuel and oxidant and an outlet; and cooling a first portion of at least one of the radially outer wall and the radially inner wall with a first cooling flow passage section, and cooling a second portion of the at least one of the radially outer wall and the radially inner wall at a different cooling rate with a second cooling flow passage section.

In another non-limiting configuration, the first cooling flow passage section and the second cooling flow passage section are arranged axially along the at least one of the radially outer wall and the radially inner wall.

In still another non-limiting configuration, the cooling comprises feeding different cooling fluids to the first cooling passage section and the second cooling passage section.

The present disclosure may include any one or more of the individual features disclosed above and/or below alone or in any combination thereof.

BRIEF DESCRIPTION OF THE DRAWINGS

A detailed description follow, with reference to the accompanying drawings, wherein:

FIG. 2 illustrates a cooling jacket for a detonation engine;

FIG. 3 illustrates sections of a cooling jacket for a detonation engine;

FIG. 9 illustrates further non-limiting configurations of flow patterns of a cooling jacket for a detonation engine;

FIG. 10 illustrates a non-limiting configuration of a cooling panel; and

FIG. 11 illustrates an alignment mechanism for assuring proper alignment of adjacent panels of a cooling jacket for detonation engine.

DETAILED DESCRIPTION

The disclosure relates to cooling of detonation engines, especially rotating detonation engines, which are referred to herein collectively as detonation engines.

Figure 1:
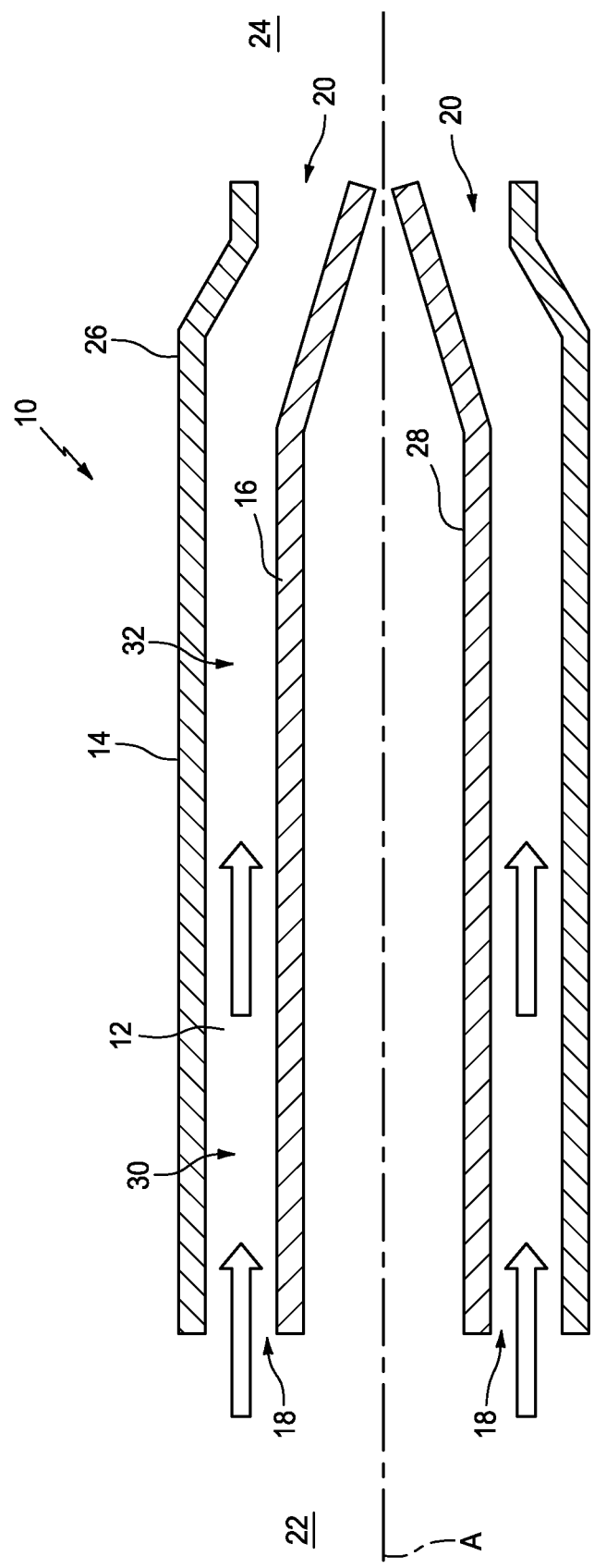
FIG. 1 schematically illustrates a rotating detonation engine.

FIG. 1 is a schematic and simplified diagram of a detonation engine, in this instance a rotating detonation engine (RDE), and the combustor structure of an RDE. As seen in FIG. 1, RDE 10 includes a detonation chamber 12, defined between a radially outer wall 14 and a radially inner wall 16. Detonation chamber 12 is an annular combustor or combustion chamber, and has an inlet 18 and an outlet 20. Fuel and oxidant, collectively referred to as reactants, are introduced to the inlet 18 in various manners. Inlet 18 can be a single inlet for all reactants, or multiple inlets for all reactants, or individual separate inlets for each reactant, in any combination as desired and all within the scope of this disclosure. RDE 10 may be defined by an upstream end 22 and a downstream end 24. RDE 10 can be cylindrical as shown. The axis A of the cylinder is illustrated in FIG. 1. The longitudinal extent of RDE 10 is the extent along the longitudinal axis A. The upstream end 22 and downstream end 24 may be referred to as the two axial ends of RDE 10. Detonation chamber 12 is defined by radially outer wall 14, which can be the inner wall surface of a housing 26, and radially inner wall 16, which can be the outer wall surface of a centerbody 28 defined along axis A. Accordingly, detonation chamber 12 has an annular cross section. It is possible for RDE 10 to have a shape other than that of a cylinder and for detonation chamber 12 to have a cross section other than annular (and hence for the continuous detonation wave to traverse a path that is other than circular in the case of an RDE). For simplicity, RDEs described herein will generally be described as cylindrical with annular detonation chambers (and hence with the continuous detonation wave propagating in a circumferential direction, or circular path, around the detonation chamber).

An upstream area of detonation chamber 12 is generally where detonation takes place, and this area is generally indicated as detonation zone 30. In a downstream direction from detonation zone 30, exhaust from the detonation travels toward outlet 20. This downstream portion of detonation chamber 12 is referred to as exhaust zone 32. Detonation zone 30 generally corresponds to the area in the detonation chamber 12 where detonation is initiated, and extending a relatively small distance downstream. Exhaust zone 32 is downstream from the area where detonation is initiated, and thermal management needs can be different in this zone. As indicated above, cooling needs are different in the detonation zone 30 as compared to the exhaust zone 32, and it is useful to be able to sufficiently cool detonation zone 30 without excessively cooling exhaust zone 32. As used herein, the terms cool, cooling and cooling rate refer to heat transfer or heat removal from an area and rates of heat transfer away from a volume or surface. Cooling applied at the same rate to both detonation zone 30 and exhaust zone 32 would tend to either insufficiently cool detonation zone 30, or cool exhaust zone 32 to the point where detonation efficiency is impacted.

FIG. 2 illustrates a wall of RDE 10, in this case radially outer wall 14. Radially outer wall 14 has cooling flow passages disposed around the wall to define a cooling jacket 34 having two cooling flow passage sections 36, 38. This cooling jacket 34 can be defined or disposed along outer wall 14 of engine 10 to provide different amounts of cooling, or cooling rate, to detonation zone 30 and exhaust zone 32 by way of different amounts of cooling supplied to or through cooling flow passage sections 36, 38. The same structure can be provided as disclosed herein for radially inner wall 16 as well. Thus, when assembled, cooling flow passage section 36 could be defined along the detonation zone 30 and would be considered an upstream cooling section, and jacket flow passage section 38 could be defined along exhaust zone 32, axially spaced from cooling flow passage section 36, and would be considered a downstream cooling section. Cooling flow passage sections 36, 38 in such a configuration are referred to herein as being axially spaced. This is not intended to mean that there is a space between the sections. Rather, this is intended to mean that the sections are positioned one after the other in an axial direction, and in fact are positioned in this manner with adjacent edges in contact, and likely bolted, welded, or otherwise coupled together.

Sections 36, 38 could advantageously have a further layer or additively manufactured material disposed over the cooling passages shown in FIG. 2, for example to present a smooth outer surface and to protect the cooling passages, but such layers are not shown in FIG. 2 for the sake of illustration of the cooling passages. Thus, while FIG. 2 shows cooling passages in cooling flow passage sections 36, 38, in actuality, outer and inner walls 14, 16, can be formed as a single wall thickness with cooling passages defined within the wall thickness.

Still referring to FIG. 2, cooling flow passage sections 36, 38 are defined by cooling channels to which cooling fluid can be introduced to provide desired cooling of the detonation zone 30 and the exhaust zone 32. These sections are configured to allow different rate of cooling in zones 30, 32, and in a non-limiting configuration to provide a greater rate of cooling in detonation zone 30 than in exhaust zone 32. This can be accomplished by providing different configurations of cooling passages in the different sections 36, 38, or by metering flow of coolant to the sections at different rates, or by utilizing different coolant fluids in the different sections 36, 38, or by a combination of these methods. In the configuration of FIG. 2, cooling passages in each section 36, 38 are defined as a helical flow passage circulating around a circumference of wall sections of outer wall 14, with upstream section 36 having a tighter spiral, or less axial distance between adjacent channel portions, than downstream section 38. In this manner, cooling fluids introduced to upstream section 36 will have a greater cooling effect in detonation zone 30 than cooling fluids introduced to downstream section 38 will have on exhaust zone 32.

FIG. 3 shows another non-limiting configuration of a portion of an outer wall 14 having cooling flow passages, wherein cooling flow passage sections 36, 38 are defined by panels having serpentine cooling flow passages. In this configuration, the cooling flow passages can have the same general structure in sections 36, 38, but coolant is metered to sections 36, 38 in different amounts. This metering is schematically illustrated at coolant source 40 with separate flow paths 42, 44 to sections 36, 38. These flow paths could have static or variable metering structure for controlling flow to each section, as desired. For example, such metering structure could be differently sized in each path 42, 44, or could be configured with controllers adapted to receive commands from a control unit which is collectively schematically illustrated at 40 along with the source of coolant. In such a configuration, the control unit could be adapted and configured to determine pressure readings at different places in engine 10, and programmed to send appropriate commands to operate controllers and thereby adjust flow, flow rate or another parameter to produce a different rate of cooling between paths 42 and 44. This could allow for a greater flow of coolant through section 36, for example to provide greater cooling to an upstream detonation zone. Alternatively, or in addition, this also allows for a different coolant to be distributed to section 36 than to section 38. For example, section 36 could be cooled with fuel for the detonation engine, while section 38 could be cooled with air. This configuration could be desirable because fuel generally has a greater capacity for cooling (i.e., greater specific heat capacity) than does air, and the fuel can advantageously be heated before being introduced to the detonation chamber of the engine.

In another non-limiting configuration, different cooling rate between sections 36, 38 can be accomplished using a bistate fluidic valve which could be positioned, for example, between section 38 and a source of coolant. The bistate fluidic valve could be controlled, for example, by temperature, and have an open and a closed condition. The bistate fluidic valve is configured to assume one position, for example closed, and to move or trigger to a second position depending upon the environmental parameter which controls the position of the valve. In this case, the parameter could be temperature, and the second position could be an open position. Thus, with a bistate fluidic valve positioned as described, at relatively lower temperatures, no coolant would be passed through the coolant paths at section 38. When temperature at section 38 reaches a threshold temperature for the bistate valve, for example at which some cooling of the exhaust section is desired, then the elevated temperature triggers the bistate valve and the valve opens, leading to flow of coolant through the coolant flow passages of section 38. Such bistate fluidic valves generally are known, but it is particularly suitable to incorporate such a valve into the present disclosure, as such a valve does not require complicated control units, and can be fine-tuned to operate on a refined and specific parameter, for example temperature at section 38.

FIG. 3 shows sections 36, 38 in wall sections or panels having edges 46 that can be bolted, welded or otherwise secured together in place along an inner or outer wall section. These sections can be full circumferential sections, meaning sections that by themselves span a full 360 degrees in the circumferential direction, or could be segments of the full circumferential wall that can be assembled to define the full 360 degree span of the radially outer and/or inner wall.

FIGS. 4-7 illustrate several different possible flow paths for cooling passages in cooling jacket 34. These illustrations are presented as line representations of the passages that can be defined within the inner or outer walls, for example with additive manufacturing. Thus, the images in FIGS. 4-7 should be seen as illustrating in line drawings the shape of passages that can be defined within the walls.

Figure 5:
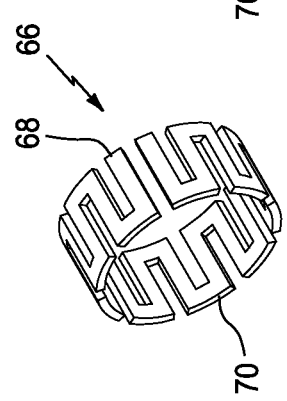
FIGS. 4-7 illustrate different non-limiting configurations of flow channels of a cooling jacket for a detonation engine.
Figure 4:
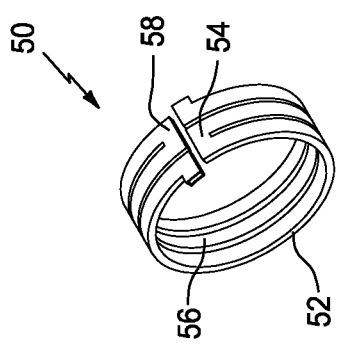
Figure 7:
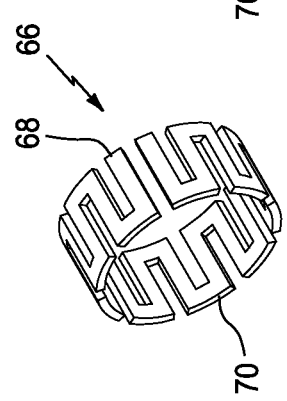
Figure 6:
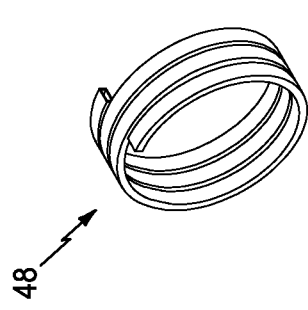

For example, FIG. 4 illustrates a simple helical cooling flow passage 48 similar to what is discussed above with respect to FIG. 2. FIG. 5 shows a cooling passage 50 arranged in a circumferential zig-zag pattern, that is, the cooling passage runs in one circumferential loop 52 around the circumference, advances along a short axial portion 54, and then runs back around another circumferential loop 56 to a further short axial portion 58. FIG. 6 shows a flow passage configuration 60 having a plurality of circumferential loops 62 that are connected at axial portions 64 to allow multiple flow paths both around circumferential loops 62 and from one loop to the next through axial portions 64. Finally, FIG. 7 shows a cooling passage configuration in the form of an axial zig-zag pattern 66, where relatively longer axial flow passages 68 are alternatingly connected by relatively shorter circumferential portions 70. It should be appreciated that the configurations of FIGS. 4-7 are non-limiting examples, and numerous other flow arrangements could be utilized in cooling flow passage sections 36, 38 well within the scope of this disclosure. Further, different configurations of these flow arrangements can have different spacing, or different flow passage size, to provide desired different cooling at sections 36, 38. Further, as set forth above, this different cooling capacity can also be provided by metering of coolant fluid at different flow rates to sections 36, 38, use of different coolant fluids in sections 36, 38, or a combination of one or more of these methods.

In another configuration, the coolant flow passages can be configured to have a greater cross sectional flow area, or flow volume per length along the axis. In other words, in section 36 where greater cooling may be desired, the cooling flow passages can have a greater flow area than in section 38.

Figure 8:
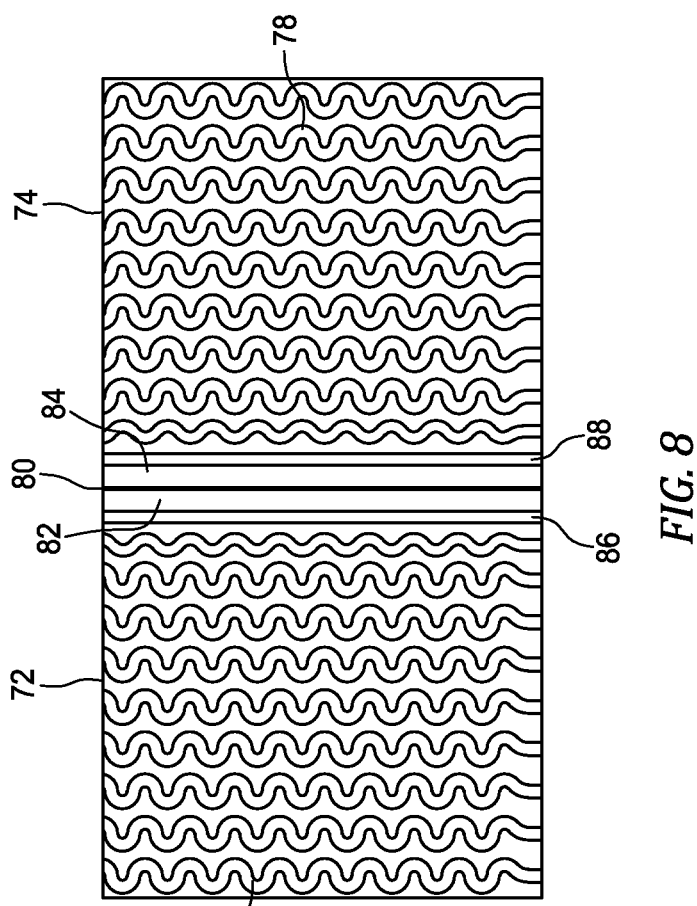
FIG. 8 illustrates non-limiting configurations of flow channels of adjoining panels of a cooling jacket for a detonation engine.

FIG. 8 illustrates another configuration of coolant passages in sections 36, 38 wherein sections 36, 38 are defined in adjacent panels or wall sections 72, 74. Each panel 72, 74 has main coolant passages that are defined as a serpentine flow path 76, 78 that provides for high efficiency cooling. FIG. 8 also shows a joint 80 where panels 72, 74 meet and can be welded or otherwise joined together. Joint 80 is an area where the wall may be more susceptible to overheating, and is also an area where it is difficult to incorporate sufficient cooling passages due to the need for sufficient structural strength at the edges 82, 84 defining joint 80. In order to provide greater cooling at joint 80, cooling passages in panels 72, 74 can be defined as straight flow passages 86, 88 in an area adjacent to edges 82, 84 to help ensure sufficient cooling at this area.

FIG. 9 illustrates another non-limiting configuration of cooling flow passages that can be implemented in accordance with this disclosure. In this configuration, cooling passages are in a chevron pattern 90, zigzagging back and forth at an angle to axis A to define the chevron array as shown. In such an array, the corners between path segments can have different shapes, several of which are illustrated. In one example, the corners can be sharp corners as shown at 92. Alternatively, the corners can be rounded as shown at 94, or can have extended flow area corners as shown at 96. Each of these shapes will influence flow in a different manner. From an efficiency of flow standpoint, it may be advantageous to maintain constant flow area as would be accomplished with rounded corners 94. From a manufacturing standpoint, other configurations may be more readily produced. Nevertheless, it should be appreciated that these characteristics and others can be modified to generate different flow.

FIG. 10 shows a panel or section 98 of a wall having cooling flow passages in the form of a panel having a frame or edge portion 99 around both axial and circumferential edges. This configuration can be advantageous in that it facilitates assembly of the panels 98 into the outer or inner wall as desired.

Cooling flow passage sections and/or panels can be assembled in place to define outer and/or inner wall of the engine, and FIG. 11 illustrates a further configuration wherein edge portion 99 of adjacent sections 98 have interlocking structure 100, in this case a protrusion 102 and a complimentary groove 104 for receiving protrusion 102. During assembly of panels, interlocking structure 100 helps to hold panels in proper alignment with each other during bolting or welding, and also can provide additional structural strength and stability after assembly, during operation of the engine.

Figure 12:
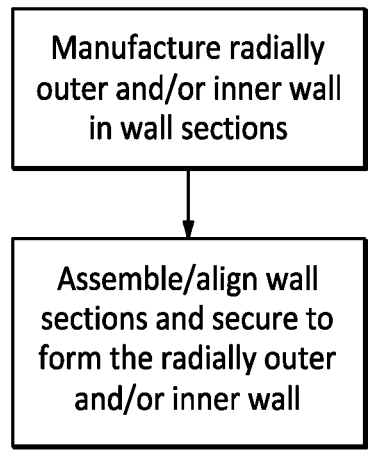
FIG. 12 schematically illustrates a manufacturing method as disclosed herein.

Manufacturing of the cooling flow passage and wall in sections facilitates making the components in additive manufacturing processes. There are few additive manufacturing facilities that have the capability to fabricate very large components. Thus, fabricating in sections also expands the number of available facilities that can be used for the fabrication. As disclosed herein, a cylindrical outer or inner wall can be prepared in cylindrical upstream and downstream sections, and each of the upstream and downstream sections can be defined by panels forming a segment of the overall cylinder. Thus, as shown in FIG. 12, a manufacturing method can include manufacturing at least one of the radially outer wall and the radially inner wall in wall sections (step 200), wherein each wall section contains a section of a cooling flow passage. This manufacturing step can be an additive manufacturing process such as direct laser metal sintering, or other additive manufacturing techniques or the like. The wall sections manufactured in step 200 can then be assembled, including, in some configurations, aligning interlocking structures 102, 104 (FIG. 11), and then securing the wall sections together to form the at least one of the radially outer wall and the radially inner wall (collectively shown at step 210).

A non-limiting manufacturing process that can be used to manufacture such wall sections or segments having cooling flow passages is additive manufacturing, wherein the wall or wall section can be built out while defining the cooling flow passages as desired. A particularly suitable additive manufacturing process is direct metal laser sintering, or DMLS, which can be used to fabricate the desired panels. Building the cooling jacket additively using DMLS offers several advantages that are not practical or cost effective using conventional manufacturing methods. For example, the wall thickness between the detonation chamber and the coolant can be made very thin to reduce the through wall resistance to cooling. Further, the channels are completely closed (as opposed to channels defined between grooves and a sleeve)

which keeps pressure stress low and ensures flow does not bypass the channels. In addition, complex and variable channel geometry can be built, such as those which are illustrated in FIGS. 4-8. Straight channels can be implemented along edges to manage metal temperatures at the joint between sections (also shown in FIG. 8) by minimizing conduction distance from coolant and allowing more flow to reduce coolant temperature rise, with more complex shapes (e.g., serpentine) used elsewhere.

For applications where fuel is used as the coolant, and it is desired for the fuel to reach a certain temperature to pre-vaporize prior to injection into the combustor, the channels can be tailored to this concern as well. For example, the straight channels implemented at the joint can help to cool the joint as mentioned above, but it is also possible that in some cases this may limit the coolant temperature exiting that channel. If this is an issue, then coolant flow configurations can be configured to nevertheless accomplish the desired amount of heating in the coolant/fuel, for example by connecting flow into the header or plenum to the mixed temperature to meet pre-injection requirements for fuel.

It will be understood that any feature or embodiment described herein, although described in the context of a cylindrical RDE with annular detonation chamber, may be in a non-cylindrical RDE with non-annular detonation chamber, or in a pulse detonation engine as well, all within the scope of the present disclosure. Further, as is evident in FIG. 1, the exhaust portion of RDE 10 can have convergent walls, and these walls can be additively manufactured along with the walls sections to define walls 14, 16. Further, if desired, the additive manufacturing process can be configured to include cooling flow passages through the convergent wall portions as well.

Figure 13:
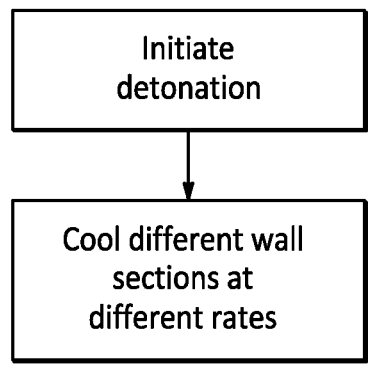
FIG. 13 schematically illustrates operation of an RDE as disclosed herein.

Referring to FIG. 13, in operation, once a detonation wave or pulse is ignited or initiated in engine 10 (step 300), thermal management can be needed in the detonation zone. During operation of the engine, the outer and/or inner wall with different sections of cooling flow passages as disclosed herein can be operated to provide a different rate of cooling to the different sections (step 302). For example, a greater cooling rate can be implemented at the detonation zone, with a lower cooling rate in the exhaust zone. Thus, in a non-limiting configuration, cooling is conducted at a greater rate in the first section corresponding to the detonation zone as compared to the second section which can correspond to the exhaust zone.

It should be noted that the use of the term "detonation chamber" as used herein does not mean that no non-detonative combustion ever occurs. Rather, non-detonative combustion may occur, and may even regularly occur, in a detonation chamber of an RDE. The term "combustion chamber" may also be used in this disclosure to refer to a detonation chamber of an RDE. RDE 10 may include a nozzle (not shown) at the downstream end 24. Fuel and oxidant can be introduced in various ways, for example directly through an inlet 18 to detonation chamber 12, which may be one or more inlets or flow passages each carrying fuel, oxidant, or both. Further, such inlets can be aligned axially as schematically illustrated in FIG. 1, or could be radial inlets arranged at one or more locations around radially outer wall 14, radially inner wall 16, or both.

In configurations where fuel is to be utilized as at least a portion of the coolant flow, it should be appreciated that such fuels can be typical jet fuel, or one or more alternative fuels such as $CH_4$, $C_2H_6$, hydrogen or other fuel.

One or more embodiments have been described. Nevertheless, it will be understood that various modifications may be made. For example, different combinations of vanes and flow apertures could be utilized, or a different number of flow passages can be provided. These modifications can influence details of particular implementations, but are otherwise within the scope of this disclosure. Accordingly, other embodiments are within the scope of the following claims.

We claim:

1. A combustor for a detonation engine, the combustor comprising:
    a radially outer wall extending along an axis;
    a radially inner wall extending along the axis, wherein the radially inner wall is positioned at least partially within the radially outer wall to define an annular detonation chamber having an inlet for fuel and oxidant and an outlet;
    a cooling flow passage defined along at least one of the radially outer wall and the radially inner wall and comprising at least two axially spaced cooling flow passage sections defined along an axial portion of one wall of the at least one of the radially outer wall and the radially inner wall, whereby a different cooling rate can be implemented in the at least two axially spaced cooling flow passage sections, wherein the at least one of the radially outer wall and the radially inner wall is defined in axially or radially spaced wall sections, and the spaced wall sections contain a portion of the at least two axially spaced cooling flow passage sections, and wherein the axially or radially spaced wall sections meet at wall edges, and further comprising interlocking structure defined along the wall edges whereby the axially or radially spaced wall sections are held in proper position relative to each other during assembly.

2. The combustor of claim 1, wherein the annular detonation chamber has a detonation zone and an exhaust zone, and wherein a first of the at least two axially spaced cooling flow passage sections is axially aligned with the detonation zone, and a second of the at least two axially spaced cooling flow passage sections is axially aligned with the exhaust zone.

3. The combustor of claim 1, wherein each of the at least two axially spaced cooling flow passage sections comprises a wall defining cooling flow passages and a portion of the at least one of the radially outer wall and the radially inner wall.

4. The combustor of claim 1, wherein cooling flow passages are configured differently between the at least two axially spaced cooling flow passage sections.

5. The combustor of claim 1, wherein the at least two axially spaced cooling flow passage sections each have cooling passages arranged in a helical flow pattern, and wherein the helical flow pattern of one of the at least two axially spaced cooling flow passage sections has a tighter spiral than the helical flow pattern of another of the at least two axially spaced cooling flow passage sections.

6. The combustor of claim 1, wherein the at least two axially spaced cooling flow passage sections have different flow volume per length along the axis.

7. The combustor of claim 1, wherein the at least two axially spaced cooling flow passage sections meet at edges, and have edge cooling passages at the edges that are configured differently from cooling passages at a central portion of the at least two axially spaced cooling flow passage sections, and wherein the edge cooling passages are straight cooling passages substantially parallel to the edges.

8. The combustor of claim 1, wherein the at least two axially spaced cooling flow passage sections have cooling passages defined in a pattern selected from the group consisting of a circumferential zig-zag pattern, an axial zig-zag pattern, a chevron pattern and combinations thereof.

9. The combustor of claim 1, wherein the at least two axially spaced cooling flow passage sections comprise an inner cooling flow passage assembly having at least two inner cooling flow passage sections defined along the radially inner wall and an outer cooling flow passage assembly having at least two outer cooling flow passage sections defined along the radially outer wall.

10. The combustor of claim 1, further comprising a bistate fluidic valve positioned between at least one of the at least two axially spaced cooling flow passage sections and a source of coolant, wherein the bistate fluidic valve comprises a valve which is triggered by temperature between a closed condition and an open condition.

11. A method for making a wall structure for a detonation engine, wherein the detonation engine comprises a radially outer wall extending along an axis; and a radially inner wall extending along the axis, wherein the radially inner wall is positioned at least partially within the radially outer wall to define a detonation chamber having an inlet for fuel and oxidant and an outlet, the method comprising the steps of:
manufacturing at least one of the radially outer wall and the radially inner wall in wall sections, wherein each wall section contains a section of a cooling flow passage; and
assembling the wall sections to form the at least one of the radially outer wall and the radially inner wall, wherein the manufacturing further comprises manufacturing an interlocking structure along edges of the wall sections, and wherein the assembling further comprises engaging the interlocking structure at the edges of the wall sections.

12. The method of claim 11, wherein the wall sections comprise at least two axially separate wall sections having axially separate cooling flow passage sections, and wherein the assembling comprises positioning the wall sections adjacent to each other along the axis.

13. The method of claim 11, wherein the manufacturing comprises additive manufacturing.

14. The method of claim 11, wherein the manufacturing comprises direct metal laser sintering.

15. A combustor for a detonation engine, the combustor comprising:
a radially outer wall extending along an axis;
a radially inner wall extending along the axis, wherein the radially inner wall is positioned at least partially within the radially outer wall to define an annular detonation chamber having an inlet for fuel and oxidant and an outlet;
a cooling flow passage defined along at least one of the radially outer wall and the radially inner wall and comprising at least two axially spaced cooling flow passage sections defined along an axial portion of one wall of the at least one of the radially outer wall and the radially inner wall, whereby a different cooling rate can be implemented in the at least two axially spaced cooling flow passage sections, and further comprising separate cooling fluid supply to the at least two axially spaced cooling flow passage sections whereby flow to the at least two axially spaced cooling flow passage sections can be metered at different rates to the at least two axially spaced cooling flow passage sections.

16. A method for cooling a rotating detonation engine, comprising the steps of:
initiating a detonation wave in an annular detonation chamber of the rotating detonation engine comprising a radially outer wall extending along an axis and a radially inner wall extending along the axis, wherein the radially inner wall is positioned at least partially within the radially outer wall to define the annular detonation chamber having an inlet for fuel and oxidant and an outlet; and
cooling a first portion of at least one of the radially outer wall and the radially inner wall with a first cooling flow passage section, and cooling a second portion of the at least one of the radially outer wall and the radially inner wall at a different cooling rate with a second cooling flow passage section, wherein the first cooling flow passage section and the second cooling flow passage section are defined axially spaced along an axial portion of one wall of the at least one of the radially outer wall and the radially inner wall, wherein the cooling comprises feeding different cooling fluids to the first cooling flow passage section and the second cooling passage section.

17. The method of claim 16, wherein the first cooling flow passage section and the second cooling flow passage section are arranged axially along the at least one of the radially outer wall and the radially inner wall.

* * * * *